United States Patent [19]

Sanada

[11] Patent Number: 5,617,394
[45] Date of Patent: Apr. 1, 1997

[54] OPTICAL DISK RECORDING METHOD AND DEVICE

[75] Inventor: Satoru Sanada, Yokohama, Japan

[73] Assignee: Nikon Corporation, Tokyo, Japan

[21] Appl. No.: 413,894

[22] Filed: Mar. 30, 1995

[30] Foreign Application Priority Data

Mar. 30, 1994 [JP] Japan ................................ 6-060409
Feb. 28, 1995 [JP] Japan ................................ 7-040007

[51] Int. Cl.$^6$ ............................................. G11B 7/00
[52] U.S. Cl. ........................... 369/58; 369/47; 369/48; 369/59
[58] Field of Search ........................... 369/47, 48, 49, 369/50, 54, 58, 59, 60, 53

[56] References Cited

U.S. PATENT DOCUMENTS 5,239,424  8/1993  Hasegawa et al. .................. 369/53 X
5,446,718  8/1995  Shimizu et al. .................... 369/59

*Primary Examiner*—Muhammad N. Edun

[57] ABSTRACT

A data recording method adapted for recording data on an optical disk having multiple tracks addressed as sectors on its recording surface. The method includes, setting the number of sectors to be recorded on a track based the position of the track on the optical disk and recording data on the track based on the number of sectors to be recorded as set during the setting step. Also provided is an optical disk recording method adapted for recording data on an optical disk having spiral shaped multiple tracks addressed as sectors on its recording surface and the number of sectors per track of the multiple tracks depending on the radial position of the track relative to a center position of the optical disk. The method includes initializing at least one sector writing data onto the initialized sectors and verifying the written sectors. Also provided is an optical disk recording device that includes an optical disk drive device recording data in relation to an optical disk having multiple tracks addressed as sectors, a memory unit storing the data to be recorded on the optical disk, a recording control unit reading and outputting to the optical disk drive device, memory unit, and a setting circuit changing a specified amount of data depending on the radial position on the optical disk onto which the data is to be recorded. Finally, an optical disk recording device is provided which includes an optical disk drive device recording data in relation to an optical disk, a memory unit storing data to be recorded on the optical disk, a recording control circuit controlling the optical disk drive device, by initializing the specified number of sectors to be recorded on the optical disk, reading the data in an amount equivalent to the specified number of sectors among the sectors stored in the memory unit, writing that data onto the sectors that have been initialized and verifying the written sectors. Also, a setting circuit sets the specified number of sectors to be processed by a single recording operation.

12 Claims, 6 Drawing Sheets

FIG. 3

| ZONE NUMBER | OPTIMUM NUMBER OF SECTORS TO BE PROCESSED |
|---|---|
| 0 | 444 |
| 1 | 452 |
| 2 | 460 |
| 3 | 467 |
| 4 | 475 |
| 5 | 483 |
| 6 | 491 |
| 7 | 499 |
| 8 | 507 |
| 9 | 512 |
| 10 | 512 |
| 11 | 512 |
| 12 | 402 |
| ~~~ | ~~~ |
| 46 | 392 |
| 47 | 396 |

OPTICAL DISK RECORDING METHOD AND DEVICE

BACKGROUND OF THE INVENTION

1. Field of the Invention

The present invention relates to optical disk and magneto-optical disk recording and playback devices which are used with computers and image processing devices.

2. Description of the Related Art

Generally, optical disks and magneto-optical disks (collectively referred to as "optical disks") are composed of concentric shaped or spiral shaped tracks on a recording surface. If one track circumference is counted as a disk, then several thousand tracks can be configured on an optical disk.

The tracks of an optical disk are divided into multiple regions called sectors. Within these sectors are data parts for the purpose of recording an identification (ID) part, in which the sector address, etc. is recorded, and the user data.

When a recording and playback device records data on an optical disk, the data that is received from a host computer, etc. is stored all at once in a buffer memory. Then, the typical recording method reads the data from the buffer memory and executes recording processing in relation to the disk. When the amount of data to be recorded exceeds the recording capacity of the buffer memory, recording processing is executed by taking the number of sectors equivalent to the recording capacity of the buffer memory to be the recording unit for one pass, and recording processing is executed repeatedly.

Moreover, it should be noted that optical disks have a higher medium bit error rate compared to magnetic disks. For this reason, during the process of recording onto an optical disk with an optical disk recording and playback device, after writing data onto the optical disk, verification processing is executed in order to confirm whether or not the data that has been written can be read back normally. This processing is called the RAW (Read After Write) check. In addition, during the process of recording onto a rewritable optical magnetic disk, generally, an erasure operation (initialization) is executed prior to writing. Such an erasure operation is carried out for the purpose of erasing data that is already recorded in the region where writing is to be executed on the optical disk.

Over the last several years there has been a remarkable increase in the capacity of external memory devices for computers and the like. Optical disk recording and playback devices are no exception to such increases in capacity. Accordingly, there have been several methods proposed to increase the recording capacity of optical disks.

One optical disk recording method that has been used for a long time is the CAV (constant angular velocity) method. In the CAV method, an optical disk is rotated at a fixed number of rotations and the recording and playback frequency is made to be the same on any track of the optical disk. In the CAV method, the linear velocity becomes faster the further out the track. Because the recording frequency is the same on every track, the lengths of the recording marks become longer the further out toward the periphery of the optical disk. Consequently, recording density becomes smaller the further out to the periphery.

Another method, the MCAV (modified CAV) method is one that greatly increases the recording capacity compared to the CAV method. In MCAV systems, the optical disk is rotated at a fixed number of rotations, and the recording and playback frequency becomes higher toward the periphery. Thus, the recording density is roughly a fixed value on any track. That is, the length of the recording marks is nearly fixed for every track.

Also, one practical form of an MCAV system is called the Zone CAV method. The Zone CAV method divides disk tracks into multiple groups of multiple tracks. These groups are called zones. These multiple zones are in a donut shape. Tracks which belong to the same zone execute recording and playback at the same clock frequency. Thus, the recording and playback frequencies become higher the further out the zone (the zones which have faster linear velocities). In this way, the recording density of the zones can be made uniform.

The recording and playback of disks which have a zone CAV format are executed with the time per track (the time it takes the disk to make one rotation) being fixed. However, because the recording and playback frequency differs depending on the respective zones, the number of sectors per track varies depending on the zone. Thus, there is the characteristic that the number of sectors per track increases the higher the recording and playback frequency of the zone (the further the zone is toward the periphery). In the MCAV method as well, the number of sectors per track increases the more the track is to the periphery of the disk.

When considering the aforementioned kinds of operation of recording onto an optical disk that has MCAV or Zone CAV formatting, during the recording operation in the interval from the completion of initialization up to the beginning of data writing, or from the completion of data writing up to the beginning of verification, there is always an optical beam seek operation time generated (the time to determine the position for moving the head from the track at a position where data writing has been completed to the track at a next position where the data writing is to begin again), and a wait time after the seek operation has been completed until the specified sector within that track is reached (the sector at which data writing is to begin).

The seek operation time is time that is unavoidable in order for the device to operate, but the wait time is wasted time. Consequently, it is desirable to shorten the wait time.

As in the past, when executing the recording operation in multiple units of sectors corresponding to the recording capacity of the buffer, the wasted wait time increases and decreases depending on the zone. The reason for this is that the number of sectors per track varies depending on the zone. When there is little wait time, there is no problem, but as the wait time increases there is the problem of inviting a reduction in the data transfer rate.

The aforementioned problems are merely exemplary of the problems addressed and solved by the present invention.

SUMMARY OF THE INVENTION

Therefore, it is an object of the invention to provide an optical disk recording method and device that can prevent reductions in data transfer rates.

It is a further object of the present invention to solve the aforementioned problems of the prior art.

It is another object of the present invention to provide an optical disk recording method and device wherein in order to heighten the transfer rate during data recording, the number of sectors processed in a single recording operation can be varied depending on the recording location on a disk.

BRIEF DESCRIPTION OF THE DRAWINGS

Objects and advantages of the present invention will become apparent and readily appreciated from the following description of the preferred embodiments, taken in conjunction with the accompanying drawing figures, of which:

FIG. 3 is a diagram that illustrates a storage table of the optimum number of sectors to be processed in an optical disk recording and playback device according to a preferred embodiment of the present invention.

DETAILED DESCRIPTION OF THE PREFERRED EMBODIMENTS

Figure 1:
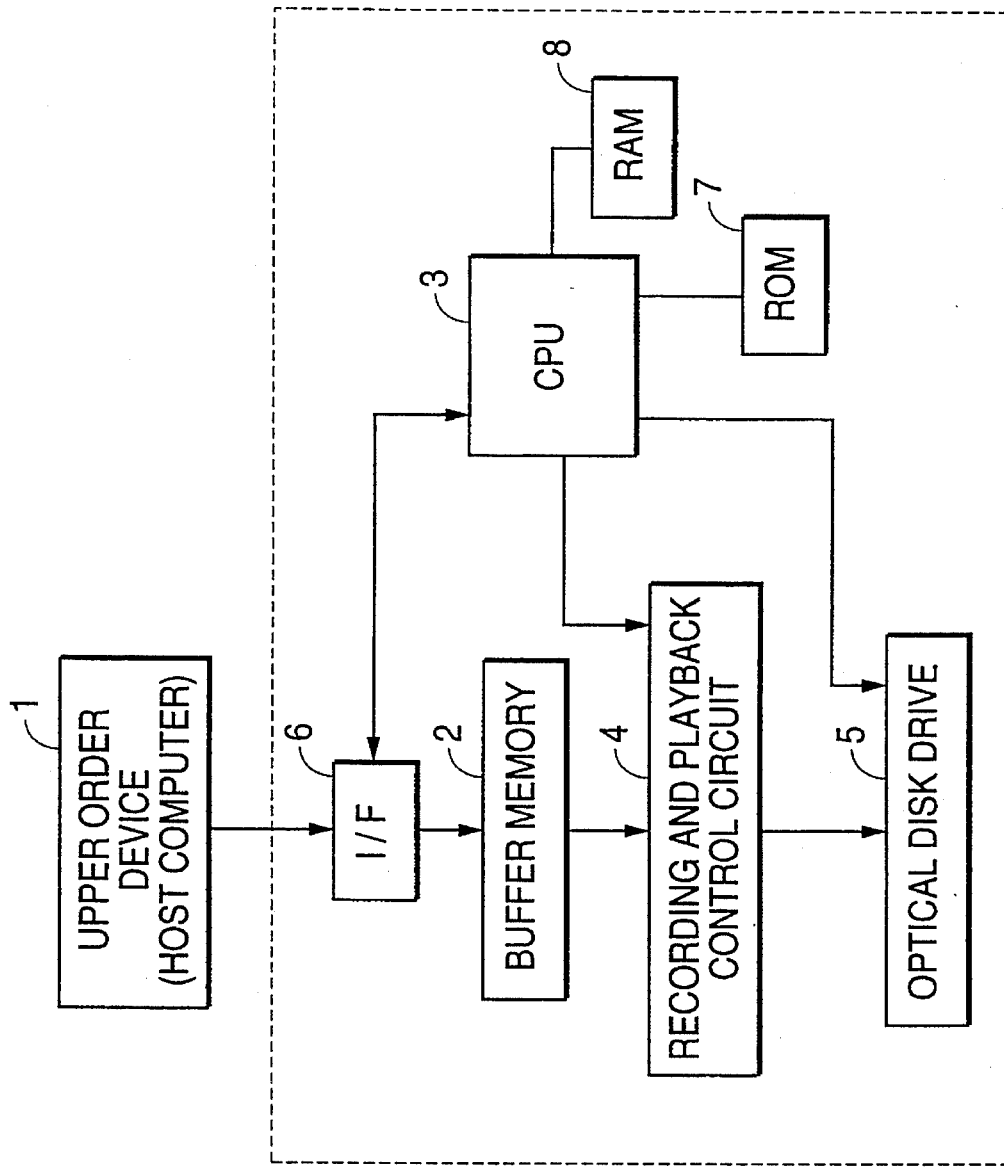
FIG. 1 is a diagram that illustrates a configuration of an optical disk recording and playback device according to a preferred embodiment of the present invention.

The following description is provided in reference to the drawing figures which were briefly described above. Like parts are referred to by like reference numerals.

Referring now to FIG. 1, therein depicted is a diagram that illustrates a configuration of an optical disk recording and playback device according to a preferred embodiment of the present invention. In FIG. 1, host computer 1 sends the data to be recorded to the optical disk recording and playback device. Of course, data which is played back from the optical disk is received using the optical disk recording and playback device.

The optical disk recording and playback device comprises buffer memory 2, recording and playback control circuit 4, CPU 3, optical disk drive device 5, ROM 7, RAM 8 and interface (I/F) circuit 6.

Interface circuit 6 enters the data sent from host computer 1. CPU 3 decodes the data entered by interface circuit 6 and controls interface circuit 6 so that, among that data, the data to be recorded on the optical disk is output to buffer memory 2.

Buffer memory 2 stores the data to be recorded that has been received from host computer 1. Recording and playback control circuit 4 reads out the data to be recorded that is stored in buffer memory 2, executes processing to add error correction codes and processing to modulate and demodulate the data, and then outputs the data to the optical disk drive device. CPU 3 controls the recording and playback control device at the beginning and end of the aforementioned operations.

Optical disk drive device 5 comprises an optical head and a spindle motor. Optical disk drive device 5 rotates the optical disk using the spindle motor. Then, an optical beam irradiated from the optical head is irradiated on the optical disk surface, and the position of that irradiation follows along the desired track. Then, following the data that is entered from the recording and playback control circuit, data is recorded on the tracks of the optical disk by modulating the strength of the optical beam that is emitted from the optical head. CPU 3 controls optical disk drive device 5 at the beginning and end of these operations.

Data indicating the optimum conditions during recording, calculated by a method that will be described later, are stored in ROM 7.

In the present embodiment, a rewritable optical magnetic disk is used as the optical disk. Consequently, the recording operation executes initialization processing (erasure processing), write processing, and verification processing (processing that makes confirmation by playing back the written data).

The recording operation, when the volume of data sent from host computer 1 is less than the recording capacity of buffer memory 2, can be executed in the same way as conventional devices.

Below, an explanation will be given of the operation to record data that exceeds the recording capacity of buffer memory 2. In addition, when recording data exceeds the recording capacity of buffer memory 2, computer 1 sends data to the optical disk recording and playback device by dividing the data multiple times.

Figure 4:
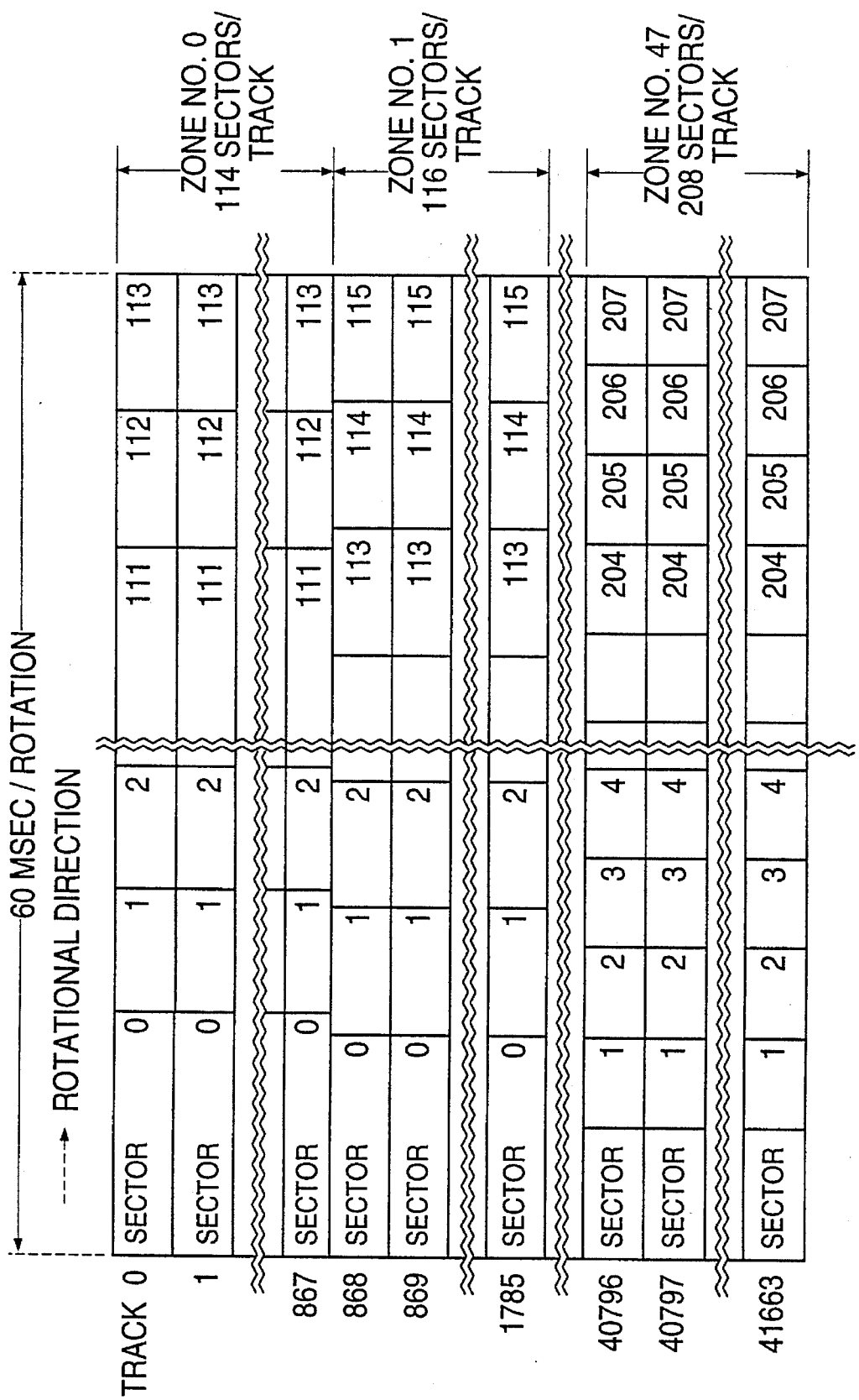
FIG. 4 is a diagram that illustrates an optical disk format having a zone CAV arrangement.

Referring now to FIG. 4, therein depicted is a diagram that illustrates the record format of the optical magnetic disk in the present embodiment. A spiral shaped track is formed on the recording surface of the optical magnetic disk. Assuming one circumference of the disk to be one track, 41664 tracks are formed. These various tracks are identified by the track numbers (0–41663) added in ascending order from the inner track.

The recording format indicted in FIG. 4 is based on the zone MCAV system. Track numbers 0–41663 are divided into 48 zones with 868 tracks per zone. Zone numbers (0–47) are added in ascending order from the inside track.

Each track is divided into multiple sectors. Within one zone, the number of sectors included within one track (one track circumference) is the same for every track.

In the present embodiment, the number of sectors within each track of the inner most zone (zone No. 0) is 114, and the number of sectors within one track of zone No. 1 which is one zone to the outside of zone 0 has two added sectors to make 116. That is, when going one zone to the outside, the number of sectors within one track is increased by two. In the outermost zone (zone No. 47), the number of sectors within one track is 208. In this way, the recording density is made uniform by increasing the number of sectors within one track the further the zone is to the outside.

In the present embodiment, the recording capacity of buffer memory 2 is 256 Kbytes. However, the present invention is not to be so limited, as other buffering and storage devices are available and will become available to provide greater capacity. The user data region within one sector of the disk which is used in this embodiment is 512 Bytes. Consequently, the number of sectors equivalent to the recording capacity of buffer memory 2 is 512.

The zone CAV disk format in FIG. 4 is:

Number of User Bytes: 512 byte/sector

Sector Increase Rate: 2 sectors/zone

Number of User Sectors: 114–208 sectors/track

Number of User Tracks: 868/zone

Number of Zones: 48.

Here, the circumstances considered will be the recording of data in the region of zone No. 0 in units of the number of sectors equivalent to the recording capacity of buffer memory 2.

The recording operation executes initialization processing, write processing, and verification processing. Consequently, first, 512 continuous sectors (the number of sectors equivalent to the recording capacity of buffer memory 2) are initialized. Then, data is written into 512 continuous sectors by returning to the sector at which initialization began. Then, the data that was written in the continuous 512 sectors is replayed and verified by returning to the sector at which writing began.

Assuming the disk rotational frequency to be 1,000 rpm, the time required for one disk rotation is 60 ms.

Because zone No. 0 has 114 sectors per track, the time (TEWV) required in order to execute initialization, data writing or verification of 512 sectors is:

$$TEWV = (512/114) \times 60 = 269.5 \text{ [msec]}$$

In this case, the irradiation position of the optical beam moves five track parts in the radial direction of the disk from the beginning of initialization or of data writing until completion. For this reason, the irradiation position of the optical beam is moved five track parts and returned to the initial position prior to the execution of the next processing. Here, the time required to move the optical beam (called the 'seek time') is 1 msec per track.

Consequently, the seek time during the above operation is 5 ms.

Also, in the recording and playback of an optical magnetic disk, control time is required in order to change the direction of external magnetic field application during the initialization processing and the write processing. Here, it is assumed that the switching of the external magnetic field occurs within the seek time.

Moreover, after the seek operation of initialization complete or write complete operations, a wait time is generated for the purpose of moving the optical beam within the track to the sector of the initial position of the next operation. The 512 sectors targeted for processing are equivalent to four tracks plus 56 sectors. Consequently, after initialization complete or writing complete operations, if the optical beam is moved relatively along the direction of the track exactly 58 sector parts, it can return to the initial position.

When considering the seek time TS, the wait time TW becomes:

$$TW = \{1-(56/114)\} \times 60 - TS = (58/114) \times 60 - 5 = 25.5 \text{ [msec]}$$

The transfer rate when continuously executing the recording operation in units of the number of sectors equivalent to the recording capacity of buffer memory 2 is calculated from the above. In considering the above-listed equations, it is important to note that the transfer rate equals the number of data Bytes to record divided by processing time (sec).

Accordingly, 512 bytes of data can be recorded for each region of sector data, and because 512 is the number of sectors to be continuously recorded, the number of recorded data bytes equals 512×512 [Bytes].

Moreover, processing time is defined as follows:

$$\text{Processing Time} = (\text{Erase time} + TS + TW + \text{recording time} + TS + TW + \text{verification time} + \text{time of one rotation}) \quad (1)$$

In addition, "the time of one rotation" is the time it takes the disk to make one rotation (60 ms). During verification processing, the written data is played back and the data played back is checked. After the check has been completed, initialization of the region to be recorded next is initiated. During verification processing, confirmation processing continues after playback has finished. For this reason, after playback processing has been completed, initialization processing is executed from the sector following the sector that has completed playback by waiting for the disk to make one rotation.

From the above, it can be observed that:

$$\text{Transfer Rate} = 512 \times 512/(269.5+25.5+5+269.5+25.5+5+269.5+60) = 282 [\times 1000 \text{ Byte/sec}] \quad (2)$$

Now, the following situation will be considered: when the data writing units are taken to be units of 444 sectors, and not units of the number of sectors equivalent to the memory capacity of buffer memory 2.

The time TEWV necessary in order to execute the processes of initialization, data writing and verification for 444 sectors is:

$$TEWV = (444/114) \times 60 = 233.7 \text{ [msec]}$$

Because the optical beam moves four track parts during these processings, the seek time TS is 4 msec.

Because 444 sectors is equivalent to three tracks plus 102 sectors, the wait time TW is defined as follows:

$$TW = \{1-(102/114)\} \times 60 - 4 = (12/114) \times 60 - 4 = 2.3 \text{ [msec]}$$

Consequently, when the record operation is executed in units of 112 sectors, the wait time TW becomes much shorter. In addition, zero is the ideal wait time TW, but in actual devices, it is preferable to assume a value that has more or less leeway (for example, about 2 msec) in consideration of fluctuations in speed when moving over tracks.

From the above, when calculating the transfer rate when executing continuous writing in units of 444 sectors, it will be observed that:

$$\text{Transfer Rate} = 444 \times 512/(233.7+2.3+4+233.7+2.3+4+233.7+60) = 293 [\times 1000 \text{ Byte/sec}] \quad (3)$$

Such a transfer rate is faster than the transfer rate in the recording operation in units of the number of sectors equivalent to the recording capacity of buffer memory 2 indicated in Formula (2).

When recording a large amount of data that exceeds the recording capacity of buffer memory 2, as indicated above, if executing the recording operation in units of 444 sectors in zone No. 0, the wait time TW can be made to be about 2 ms.

In this way, the following explanation can be given of the method of deriving the units of the number of sectors for the purpose of making the wait time during the recording operation be the optimum value.

The number of sectors S, for which the recording operation is continuously executed, and the wait time TW establish the following relationship.

$$S = N(L-1) + N(Tr-Ts-Tw)/Tr \quad (4)$$

Where:
S=The number of sectors for which the recording operation is continuously executed
Tw=Wait time [msec]
Ts=Seek time [msec]
Tr=Time required to make one disk rotation [msec]
N=Number of sectors within one track
L=Number of tracks to be continuously recorded (fractions rounded up)

When data in a volume that exceeds the recording capacity of buffer memory 2 is recorded, the value of S (the number of sectors in which the recording operation is continuously executed) is preferably as large as possible. Nonetheless, making a value that exceeds the number of sectors equivalent to the recording capacity of buffer memory 2 (512 sectors in this embodiment) causes problems.

Consequently, if the number of sectors equivalent to the recording capacity of buffer 2 is taken to be A, $$S \leq A \tag{5}$$

Accordingly, from Formula (4) and Formula (5), $$N(L-1)+N(Tr-Ts-Tw)/Tr \leq A \tag{6}$$

Moreover, assuming the zone number of the zone in which recording is executed to be z, in the present embodiment, $$N=114+2z \tag{7}$$

In the present embodiment, Tw=2, Ts=L, Tr=60, and A=512. When substituting these values into Formula (6) and Formula (7), it will be observed that:

$$(114+2z)(L-1)+(114+2z)(60-L-2)/60 \leq 512 \tag{8}$$

$$L \leq (2z+15474)/\{59/(z+57)\} \tag{9}$$

The maximum value of L that fulfills Formula (9) for each zone can be calculated as follows:

Zone Nos. 0–8 L=4

Zone Nos. 9–30 L=3

Zone Nos. 31–47 L=2

Based on these L values, the value of S can be calculated from Formula (4) and Formula (7) for each zone.

The processing time TEWV of initialization, writing and verification respectively can be derived for S sectors from the S value as follows:

$$TEWV=Tr \cdot S/N$$

Additionally, the data transfer rate can be derived from the TEWV value. If the data transfer time is taken to be V, then:

$$V=512S/(3TEWV+2Ts+2Tw+Tr) \tag{10}$$

Ts can be derived from Formula (4). Moreover, Tw can be calculated from the value of L.

Performed in the above manner, the transfer rate for the recording operation in each zone can be calculated.

Next, the transfer rate in each zone can be calculated for the recording operation in units of the number of sectors (512) corresponding to the recording volume of buffer memory 2. This can be calculated in the same manner as the method for calculating the transfer rate in the previously described zone No. 0.

Figure 5:
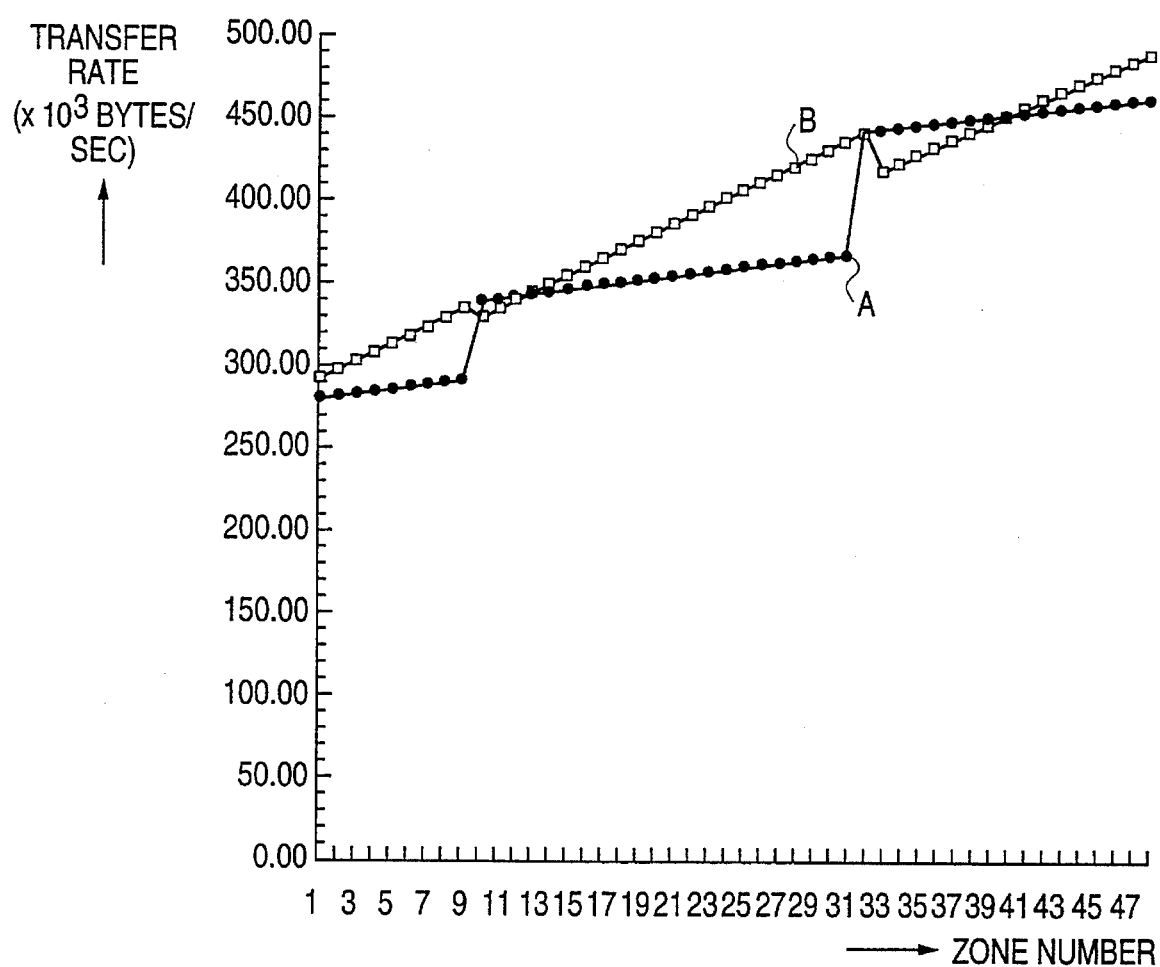
FIG. 5 is a diagram that illustrates transfer rates when recording in units of the memory capacity of the buffer memory is used during data recording and when recording in the number of sectors in which the wait time is the optimum is used during data recording.

Referring now to FIG. 5, therein depicted is a diagram for the purpose of comparing the data transfer rate (flag A) for each zone when the recording operation is executed in units of the number of sectors equal to the recording capacity of buffer memory 2, and the data transfer rate (the value of B derived by Formula (10), flag B) in each zone when the recording operation is executed in units of the number of Dectors such that the wait time as calculated above is the optimum value.

According to FIG. 5, it has been found that in many zones the data transfer rate is faster when the recording operation is executed in units of the number of Dectors wherein the wait time is the optimum value. Nonetheless, there are also zones in which the data transfer rate is faster when the recording operation is executed in units of the number of sectors corresponding to the recording capacity of buffer memory 2 (e.g., zone Nos. 9–11).

The optimum conditions in each zone are the conditions where the data transfer rate is fastest.

In the above-described manner, the optimum value for the number of sectors to be continuously recorded can be calculated.

Referring now to FIG. 3, therein depicted is a diagram that illustrates the optimum value of the number of sectors to be continuously recorded for each zone as calculated in the above manner.

The optimum values indicated in FIG. 3 for the number of sectors to be continuously recorded for each zone are calculated in advance and those values are stored in ROM 7 as a data table for each zone.

Below, an explanation will be given of the operation of an optical disk recording and playback device of the present embodiment based on FIGS. 1 and 2.

Figure 2:
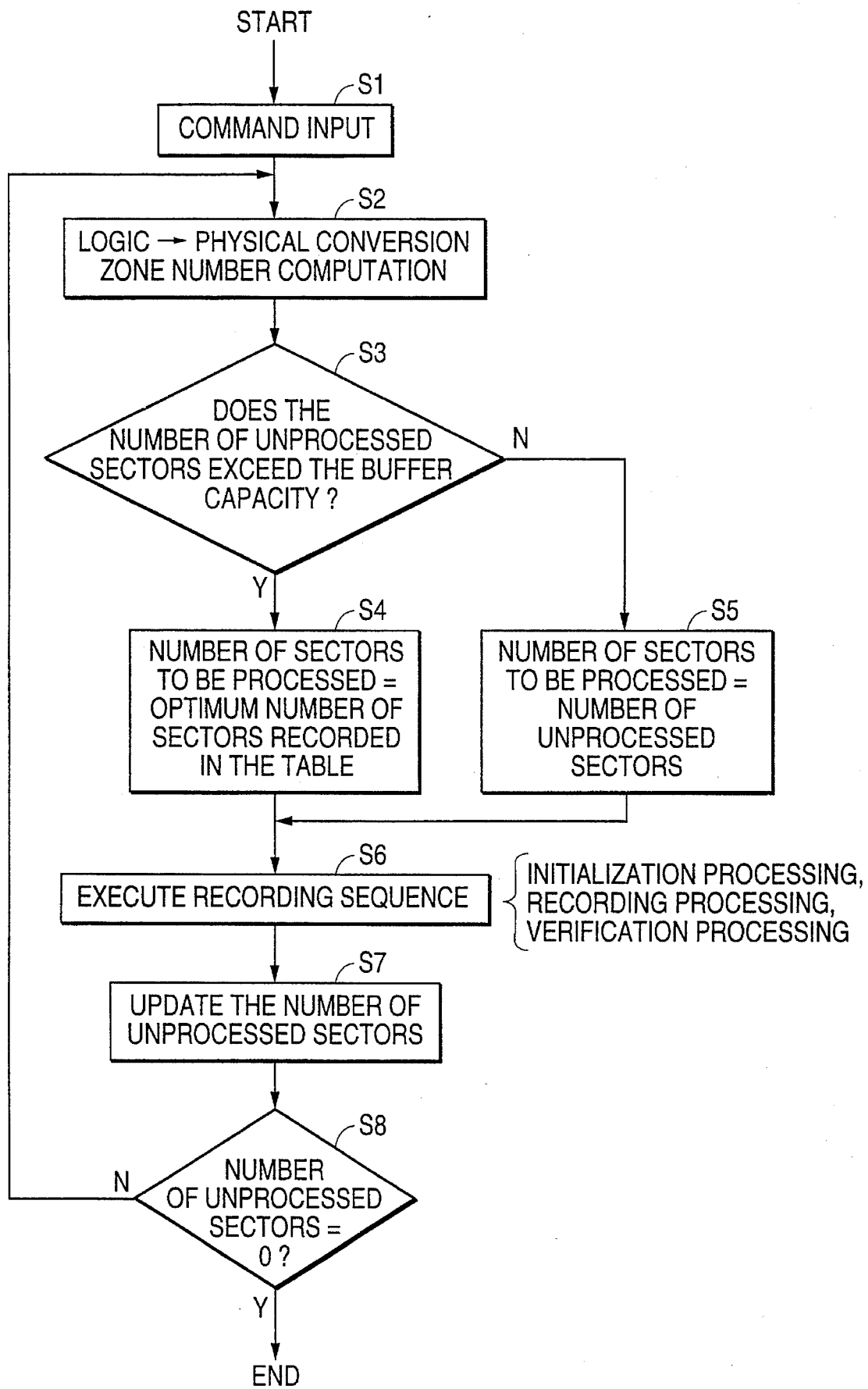
FIG. 2 is a diagram that illustrates recording sequence of an optical disk recording and playback device according to a preferred embodiment of the present invention.

In particular, FIG. 2 is a flowchart for the purpose of illustrating the recording operation in an optical disk record and playback device according to the present embodiment.

The recording of data onto the optical disk begins by the record command being sent from host computer 1. Together with the record command, host computer 1 sends information indicating the volume of the data to be recorded. After this, the data to be recorded and the logical address data for recording are sent.

The data sent from host computer 1 is entered by interface circuit 6. CPU 3 decodes the data entered by interface circuit 6. Then, when the write command is received, CPU 3 calculates the number of sectors corresponding to the volume of data to be recorded, and memorizes or stores that value in RAM 8. The value of the number of sectors memorized in RAM 8 becomes the value of the number of unprocessed sectors to be described later. Next, CPU 3 executes control to store the data to be recorded that has been sent in buffer memory 2 (FIG. 2, step S1). When data that is just the record capacity of buffer memory 2 is received, CPU 3 suspends data reception from host computer 1. In addition, CPU 3 converts the logical address that was sent to the physical address. The physical address is the data indicating the physical position on the optical disk of the sector to be recorded. CPU 3 converts the logical address to the physical address. Furthermore, CPU 3 calculates the zone number of the zone to which the track of that physical address belongs (FIG. 2, step S2), As indicated in FIG. 4, for example, data indicating the relationship between the track number (specifically the track address) and the zone number are stored in ROM 7 in advance, and CPU 3 can accomplish the calculations by referring to that data.

Next, CPU 3 reads out the value of the number of sectors memorized or stored in RAM 8. This number of sectors is the number of sectors equivalent to the capacity of the unprocessed data (the data for which recording has not been completed) from among the data to be recorded. This number of sectors is called the number of unprocessed sectors.

After determining the zone number in which the data will be recorded, CPU 3 calculates the optimum number of processing sectors. At this time, CPU 3 decides whether or not the number of unprocessed sectors exceeds the number of sectors equivalent to the recording capacity of buffer memory 2 (512 sectors in this embodiment) (FIG., step S3). If the number of unprocessed sectors is 512 or less, the optimum number of processing sectors is taken to be 512 (specifically the number of sectors equivalent to the recording capacity of buffer memory 2) (FIG. 2, step S5). If the number of unprocessed sectors exceeds 512, CPU 3 calculates the optimum number of processing sectors in that zone by referring to the data table within ROM 7 (FIG. 2, step S4).

Thereafter, CPU 3 issues in order the commands for initialization/data writing/verification processing to recording and playback control circuit 4 in units of that number of sectors (FIG. 2, step S6). This series of operations of initialization processing, data writing processing and verification processing are called the recording sequence. Specifically, CPU 3 first puts out the initialization processing command to recording and playback control circuit 4. Together with circuit 4, CPU 3 executes control by moving the optical head within optical disk drive device 5 to the track and sector on the optical disk at which initialization is to begin.

Recording and playback control circuit 4 makes the intensity of the optical beam that is irradiated from the optical head within optical disk drive device 5 to be the erasure level. Then, CPU 3 executes control to switch the external magnetic field (the magnetic field which is applied to the optical magnetic disk) within optical disk drive device 5 to the erasure direction. In the operation to initialize the optical magnetic disk, the direction of magnetization perpendicular to the data part of each sector is lined up in the same direction by irradiating an optical beam of a fixed level of intensity onto the optical magnetic disk, and by applying a magnetic field in a fixed direction (up or down in relation to the recording surface of the optical magnetic disk).

When the initialization of the number of specified processing sectors is completed, CPU 3 gives the command to recording and playback control circuit 4 for writing processing. Together with circuit 4, CPU 3 executes control to return the optical head within optical disk drive device 5 to the track and sector at which initialization was begun.

Recording and playback circuit 4 reads out the data in order from buffer memory 2, and writes that data in order in the sectors. At this time, CPU 3 executes control to switch the external magnetic field within optical disk drive device 5 in the opposite direction to the erasure direction. Then, recording and playback control circuit 4 executes the specified modulation by adding error correction codes to the data that is read out from buffer memory 2. Recording and playback control circuit 4 executes controls to modulate the intensity of the optical beam that is irradiated from the optical head within optical disk drive device 5 corresponding to the modulated data.

Now, an explanation will be given of an example when the zone onto which the data is to be recorded is zone No. 0. Recording onto zone 0 is executed in units of 444 sectors. After completing initialization of 444 continuous sectors, data writing is begun by returning to the sector at which initialization was begun. 444 sectors of data are read from buffer memory 2 in order, and written into the respective sectors. 512 sectors of data are stored in buffer memory 2. When the writing of 444 sectors of data is completed, unprocessed data of 68 sectors remain. When the writing processing is completed, CPU 3 commands recording and playback control circuit 4 to conduct verification processing. In addition to such operation, CPU 3 executes control routines to return the optical head within optical disk drive device 5 to the track and sector at which writing was begun.

Recording and playback control circuit 4 makes the intensity of the optical beam that is irradiated from the optical head within optical disk drive 5 to be the playback level. Then, playback data is created by the light reflected from the optical beam that is irradiated on the optical magnetic disk surface being received by a photodetector within the optical head, and converting this to electric signals.

Then, 444 sectors of playback data are entered into recording and playback control circuit 4 in order. Recording and playback control circuit 4 executes error detection and error correction in relation to the playback data that is input. If the decision results for error detection are OK, the 444 sectors of data that have been written into buffer memory 2 are not necessary.

In the above-described manner, when the recording sequence is completed, CPU 3 modifies the number of unprocessed sectors that have been recorded in RAM 8 (FIG. 2, step S7). In this case, it is modified to a value in which the 444 sectors that have completed recording is subtracted from the number of unprocessed sectors prior to the execution of the recording sequence. Then, as determined in step S8 (FIG. 2), if the number of unprocessed sectors is zero, data recording processing is completed. If the number of unprocessed sectors is not zero, then the flow returns to step S2, and the processing is repeated.

If the number of unprocessed sectors is not zero after the first recording sequence has been completed, CPU 3 requests host computer 1 through interface circuit 6 to transmit the next data to be recorded. When the data to be recorded is sent from host computer 1, CPU 3 executes control to store the data to be recorded that has been sent in buffer memory 2 in order. At this time, the storage region within buffer memory 2 is taken to be the region in which the 444 sectors of data that have finished being recorded was stored. When the 444 sectors of data are sent from host computer 1, the storage region of buffer memory 2 is filled. At this time, CPU 3 suspends the reception of data from host computer 1.

Then, the previously described recording operations are repeated. The position at which initialization processing begins is the sector following the final sector on which the data was recorded by the previous recording processing.

In addition, buffer memory 2 is a so-called FIFO (first in, first out) memory in which the data that is first entered is output in order. Consequently, in the second recording operation, the data is output in order from the 68 sectors of data that remained unprocessed in the first recording sequence, and this is written to the disk.

Furthermore, in the present embodiment, an explanation was given of the recording processing that accompanies initialization processing and verification processing, but even when accompanying only one or the other of these processings, it is clear from the explanation thus far that the device of the present embodiment contributes to the improvement of the data transfer rate during writing as well.

When the recording sequence includes both initialization processing and verification processing, the transfer rate is further improved by the method to be explained below.

In fact, with the following method, there are two important features:

1. During the verification processing operation, error detection and error correction processing by recording and playback control circuit 4 is also conducted after reading the data from the disk. However, the initialization processing that is executed next does not require execution after error detection and error correction processing have been completed; and 2. During verification processing, it is not necessary to control the external magnetic field. However, in initialization processing it is necessary to control the external magnetic field.

From the above-described features, processing to switch from verification processing to initialization processing is executed in the following manner: External magnetic field control is executed after verification processing is competed, after verification completion, initialization of the subsequent sector is immediately executed. As a result, there is no rotation wait time of the disk in the interval from after the completion of verification processing up to the beginning of initialization processing. Specifically, this means that the time of one rotation in the previously described Formula (1) is zero.

The data transfer rate in the device of the above-described embodiment is further improved by adding a device which executes the above-described kind of switching processing from verification processing to initialization processing.

Figure 6:
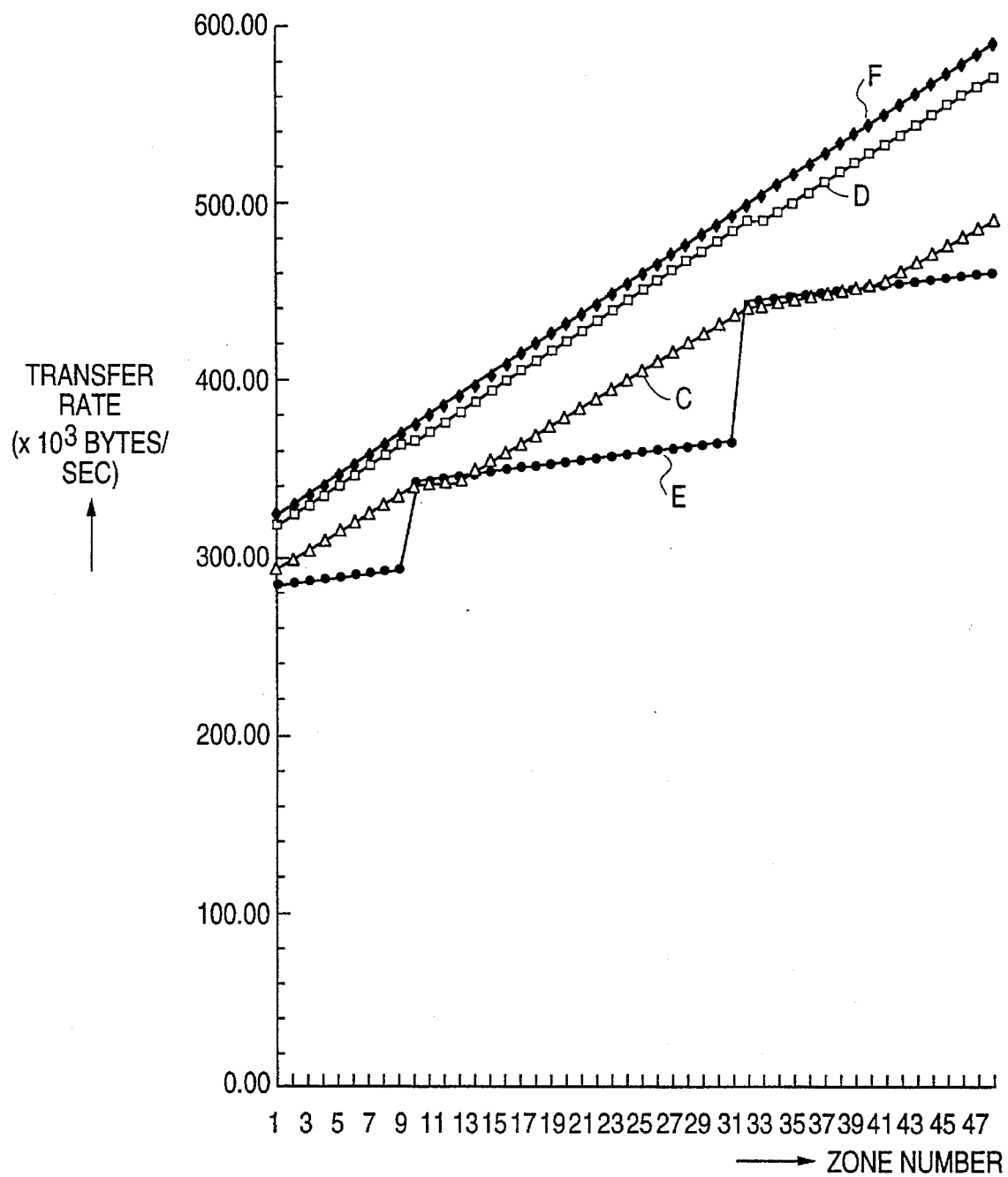
FIG. 6 is a diagram that illustrates the transfer rates of an optical disk recording and playback device according to a preferred embodiment of the present invention.

FIG. 6 is a diagram indicating the transfer rate in an optical disk recording and playback device according to another embodiment of the present invention. Line C indicates the transfer rate based on the device of the first-described embodiment. Line D indicates the transfer rate based on the device of this second embodiment. Line E indicates the transfer rate based on conventional devices (devices which execute recording in units of the number of sectors equivalent to the memory capacity of the buffer memory). Line F indicates the logical maximum value of the transfer rate. The logical maximum value is the logical value when the seek time and wait time are taken to be 0, and processing is executed for initialization, writing and verification.

As indicated in FIG. 6, the transfer rate by the device of the second embodiment is improved over the transfer rate of the device of first embodiment described herein.

As described above, according to the devices of the first and second embodiments, when recording onto an optical disk which has been divided into multiple zones and the number of sectors per track varies according to the zone, it is possible to change the number of sectors to be processed in a given recording sequence for every zone such that the transfer rate becomes the maximum rate possible. Consequently, there is no reduction in the transfer rate for any zone.

Although preferred embodiments of the present invention have been shown and described, it will be readily appreciated by those skilled in the art that many changes and modifications may be made to such preferred embodiments without departing from the principles and spirit of the present invention, the scope of which is defined in the appended claims and their equivalents.

What is claimed is:

1. A data recording method adapted for recording data on an optical disk having multiple tracks each including a plurality of sectors on its recording surface, wherein the multiple tracks are grouped as a plurality of zones, said data recording method comprising:

calculating an optimum number of sectors to be continuously recorded for each of the plurality of zones on the optical disk;

determine the number of unprocessed sectors to be recorded on the optical disk;

dividing the number of unprocessed sectors into a plurality of unprocessed sector units in accordance with the calculated optimum number of sectors; and recording a first unprocessed sector unit of said plurality of unprocessed sector units on said optical disk.

2. The method of claim 1, wherein the number of sectors per track recorded during the recording step is greater in an outer portion of the optical disk than an inner portion of the optical disk.

3. The method of claim 1, wherein the number of sectors per track recorded during the recording step decreases as the tracks approach a central area of the optical disk.

4. The method of claim 1, wherein the determining, dividing and recording steps are repeatedly executed until all of the data has been recorded on the optical disk.

5. The method of claim 1, wherein the calculating step is executed prior to the recording step, said method further comprising the step of:

verifying the integrity of the data recorded during the recording step.

6. An optical disk recording method adapted for recording data on an optical disk having spiral shaped tracks addressed as sectors on its recording surface and grouped as a plurality of zones, the number of sectors per track of the multiple tracks depending on the radial position of the track relative to a center position of the optical disk, said method comprising the steps of:

calculating an optimum number of sectors to be continuously recorded for each of the plurality of zones on the optical disk;

determining a number of unprocessed sectors to be recorded on the optical disk;

dividing the number of unprocessed sectors into a plurality of unprocessed sector units in accordance with the calculated optimum number of sectors;

initializing a sector;

writing data onto the initialized sector to produce a written sector;

verifying the written data on the written sector; and repeating the initializing, writing and verifying steps until all of the data has been recorded;

wherein the number of sectors processed by the initializing, writing and verifying steps depends on the recording position of the initialized sector on the optical disk.

7. The optical disk recording method of claim 6, wherein the number of initialized sectors is greater in an outer portion of the optical disks than in an inner portion of the optical disks.

8. The optical disk recording method of claim 6, wherein the number of initialized sectors decreases as the sectors approach a central region of the optical disk.

9. An optical disk recording device comprising:

an optical disk drive device recording data in relation to an optical disk having multiple tracks addressed as sectors on a recording surface;

a memory unit which stores the data to be recorded on the optical disk as a plurality of unprocessed sectors;

a recording control unit reading and outputting to the optical disk drive device an unprocessed sector unit of predetermined size from the plurality of unprocessed sectors stored in the memory unit; and a setting circuit which changes the predetermined size of the sector unit depending on the radial position on the optical disk onto which the data is to be recorded.

10. The optical disk recording device of claim 9, wherein a number of sectors per track is greater in an outer portion of the optical disk than an inner portion of the optical disk.

11. The optical disk recording device of claim 9, wherein a number of sectors per track decreases as the tracks approach a central region of the optical disk.

12. An optical disk recording device comprising:

an optical disk drive device which records data in relation to an optical disk having spiral shaped multiple tracks addressed as sectors, the number of sectors per track differing depending on a radial position of the track on the optical disk;

a memory unit storing data to be recorded on the optical disk;

a recording control circuit controlling the optical disk drive device by performing recording operations including determining a number of specified sectors to be recorded on the optical disk dividing the number of specified sectors into a plurality of specified sector units, initializing a specified number of sectors to be recorded on the optical disk for each of the specified sector units, reading data from the memory unit in an amount equivalent to the specified number of sectors for each of the specified sector units, writing data in the initialized sectors and verifying the integrity of the written sectors; and a setting circuit which sets the specified number of sectors to be processed by a single recording operation depending on the radial position of the specified number of sectors on the optical disk;

wherein, after the verification processing has completed for the written sectors, the recording control circuit continues to execute initializing of a sector following the written sectors.

* * * * *